United States Patent [19]

Tsukamoto

[11] Patent Number: 4,955,297
[45] Date of Patent: Sep. 11, 1990

[54] SEEDING PLANTER SHOE FOR AGRICULTURAL PLANTERS

[76] Inventor: Masa Tsukamoto, 99 W. 1000 North, Blackfoot, Id. 83221

[21] Appl. No.: 402,892

[22] Filed: Sep. 5, 1989

[51] Int. Cl.⁵ .......................... A01C 5/06; A01B 15/00
[52] U.S. Cl. .................................... 111/152; 111/908; 172/719; 172/722
[58] Field of Search ............ 172/719, 747, 772, 772.5, 172/722, 272, 724, 765, 723; 111/124, 125, 126, 111, 152, 153, 154, 156

[56] References Cited

U.S. PATENT DOCUMENTS

| | | | |
|---|---|---|---|
| 1,499,402 | 7/1924 | Petersen | 172/719 |
| 1,606,799 | 11/1926 | Kassebeer | 172/722 |
| 1,607,102 | 11/1926 | Schutter | 111/152 |
| 2,764,111 | 9/1956 | Collins | 111/152 X |
| 2,768,591 | 10/1956 | James | 111/124 |
| 3,005,502 | 10/1961 | Teal | 172/726 |
| 3,108,551 | 10/1963 | Wilson | 111/153 |
| 3,126,969 | 3/1964 | Sewell | 172/719 |
| 3,517,752 | 6/1970 | Glu | 111/152 |
| 4,823,884 | 4/1989 | McCall | 172/747 X |

FOREIGN PATENT DOCUMENTS

| | | | |
|---|---|---|---|
| 279969 | 12/1967 | Australia | 111/111 |
| 2808882 | 9/1979 | Fed. Rep. of Germany | 111/908 |
| 7601578 | 8/1977 | Netherlands | 111/111 |
| 1371538 | 2/1988 | U.S.S.R. | 111/152 |

Primary Examiner—Danton D. DeMille
Attorney, Agent, or Firm—Mallinckrodt & Mallinckrodt

[57] ABSTRACT

A seend planter shoe adapted to lift displaced soil up and out of the planting furrow or furrows being formed as the shoe is drawn through agricultural soil, substantially without compressing the soil remaining in place and defining the furrow laterally, which shoe has a prow sloping upwardly and backwardly from a forward soil-penetrating point at and depending below the bottom of the shoe proper, which is substantially planar, and side walls that diverge backwardly and upwardly, from a prow piece to which they are rigidly joined, for from about one-half to about three-quarters the length of the shoe and continuing on longitudinally of the shoe substantially in parallel for the remainder of the length of the shoe. The side walls are preferably of steel plate faced outwardly over a substantial portion of their height by wear-resistant plastic plates and marginally of their bottom edges by strips of steel plate. The prow piece slopes backwardly at an angle of about forty-five to about fifty degrees, and preferably forty-seven degrees, to the planar bottom of the shoe. Preferably, a series of forwardly sloping, diagonal members are applied to the shoe exteriorly thereof along the bottom margins of its side walls to facilitate maintaining of proper depth as the shoe is drawn through the soil.

6 Claims, 4 Drawing Sheets

SEEDING PLANTER SHOE FOR AGRICULTURAL PLANTERS

BACKGROUND OF THE INVENTION

1. Field

This invention is concerned with planter shoes for agricultural planters.

2. State of the Art

A variety of soil-penetrating so-called "shoes" have been developed through the years for different purposes. They are of various shapes in accordance with different conditions of use and results desired. Although agricultural plows or sweeps are not normally regarded as "shoes", they are of generally similar form whether constructed merely for working the soil prior to furrowing for the planting of row crops or for furrowing previously worked soil for row crop planting. Also, there are so-called "irrigation shovesl", such as those produced and sold by Acme Products Co., Filer, Idaho, for digging irrigation channels between row plantings of crops, and there are a variety of different forms of seeding shoes.

Thus, Schutter U.S. Pat. No. 1,607,102 issued Nov. 16, 1926 discloses an agricultural planter having seeding shoes for forming furrows immediately prior to depositing seeds in the furrows formed by the shoes; Teal U.S. Pat. No. 3,005,502 issued Oct. 24, 1961 discloses a so-called "seed furrow plow" in which plowing blades are arranged in a particular way to prepare agricultural land for planting prior to actual deposit of the seed; and Glee U.S. Pat. No. 3,517,752 issued Jun. 30, 1970 discloses a so-called "planting shovel" for mounting on an agricultural planter to provide a furrow from which underlying wet soil has been raised and redeposited relative to dry soil at the surface, so that seed deposited in the furrow during travel of the planter through the agriculture area concerned will not require initial surface watering.

In each of the above-mentioned prior art patents, the shoes concerned are made, as in the shoe of this invention, contrary to the popular notion of how a planting shoe should be shaped, i.e., they are made with furrowing blades sloping backwardly from a point at the bottom of the shoe and diverging outwardly as they slope backwardly, in contrast to the usual seeding shoe shaped as is the prow of a ship, with the point uppermost and the furrowing blades sloping backwardly from such point and converging inwardly and downwardly as they slope backwardly.

In Collins U.S. Pat. No. 2,764,111 issued Sept. 25, 1956, a fertilizing implement has a somewhat similar fertilizing shoe provided with a relatively small furrow-opening blade at its rear immediately forwardly of a tube for depositing legume seeds, so as to open a small seed-planting furrow directly over and slightly above the fertilizer which is deposited, along with a covering quantity of soil at the sides of the main furrow by reason of the fact that the bottom edges of the side plates of the shoe slope upwardly as they extend rearwardly.

In none of these patents is the degree of prow slope disclosed as critical.

SUMMARY OF THE INVENTION

In accordance with the invention, a shoe for planting seeds of various food crops, such as potatoes, corn, etc. is shaped and constructed to provide a planting furrow of proper depth while gently pushing displaced soil upwardly and automatically forming side ledges of intermediate height bordering a narrow, central, seed-receiving furrow, all without any significant compression of the surrounding soil and while lifting trash and excess soil up and out.

For this purpose, the shoe is shaped oppositely to the prow of a boat, that is to say with a prow that slopes upwardly and backwardly as are the instances of prior art noted above. Contrary to that prior art, however, the backward slope of the prow is at substantially a particular angle to the planar bottom of the shoe (from about forty-five to about fifty degrees), extending from a forward, soil-penetrating point at and depending below the bottom of the shoe, effective to raise displaced soil up and out of the furrow without significant compression of the surrounding soil. The shoe is constructed with backwardly extending side walls that initially diverge from and behind a prow piece to which they are, in effect, rigidly integral therewith, while also diverging upwardly, and that then extend longitudinally rearwardly therefrom substantially in parallel. Lower edges of the side walls provide a substantially planar bottom for the shoe without upward slope. However, as installed on a planting machine, the rear end of the planter shoe should be approximately one inch higher than the front end in order to automatically form the ledges bordering the central planting furrow.

The side walls of the planting shoe are preferably steel plate faced externally of the shoe by smooth surfaced plates of long wearing plastic material, such as Nylon.

THE DRAWINGS

The best mode presently contemplated for carrying out the invention in practice is represented by the embodiment illustrated in the accompanying drawings, in which:

FIG. 1 is a pictorial view of a typical seed planting machine equipped with planter shoes of the invention, the view being taken looking toward the front of the machine from one side thereof;

FIG. 2, a similar view of one of the seed planter shoes of FIG. 1, shown per se and drawn to a considerably larger scale;

FIG. 3, a top plan view of the seed planter shoe of FIG. 2 drawn to a reduced scale and showing the planter tube that extends downwardly from the correpsonding seed supply bin of FIG. 1;

FIG. 4, a bottom plan view;

FIG. 5, a vertical section taken along the line 5—5 of FIG. 3; and

FIG. 6, a vertical section taken transversely across a planting furrow made by one of the seed planter shoes of FIGS. 1 and 2.

DETAILED DESCRIPTION OF THE ILLUSTRATED EMBODIMENT

Figure 2:
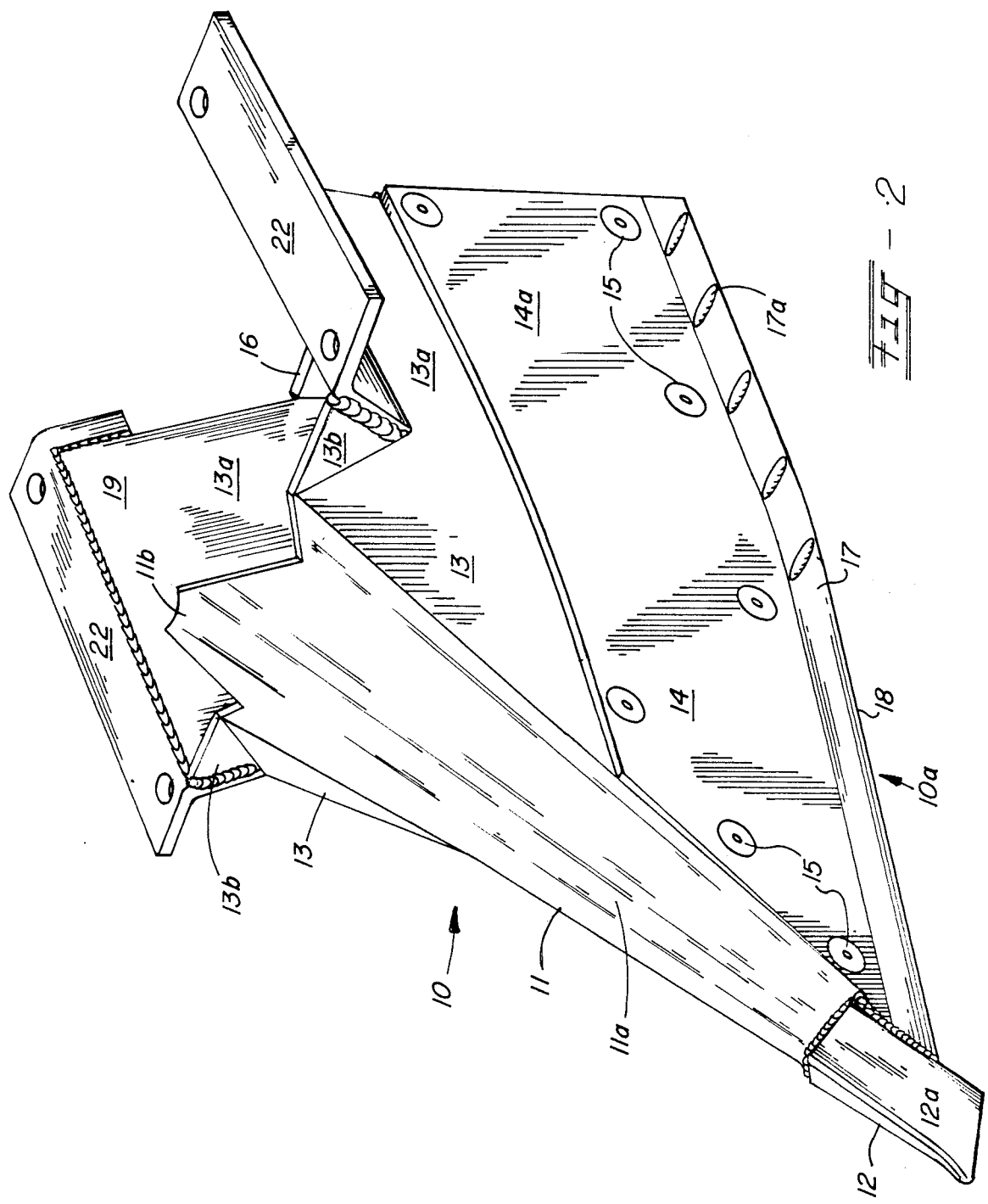
Figure 3:
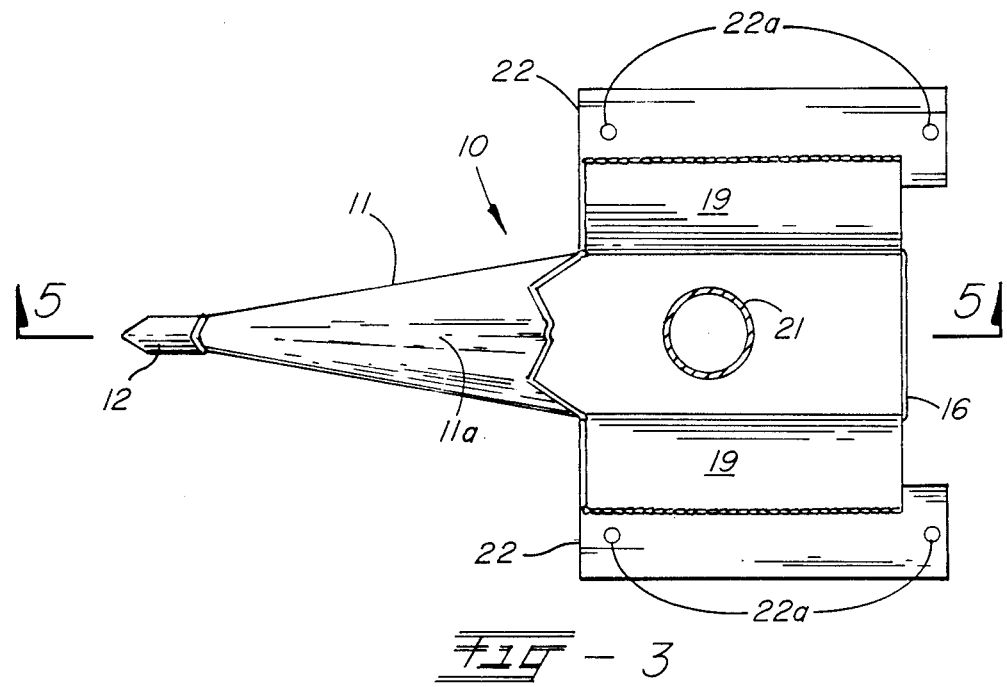
Figure 4:
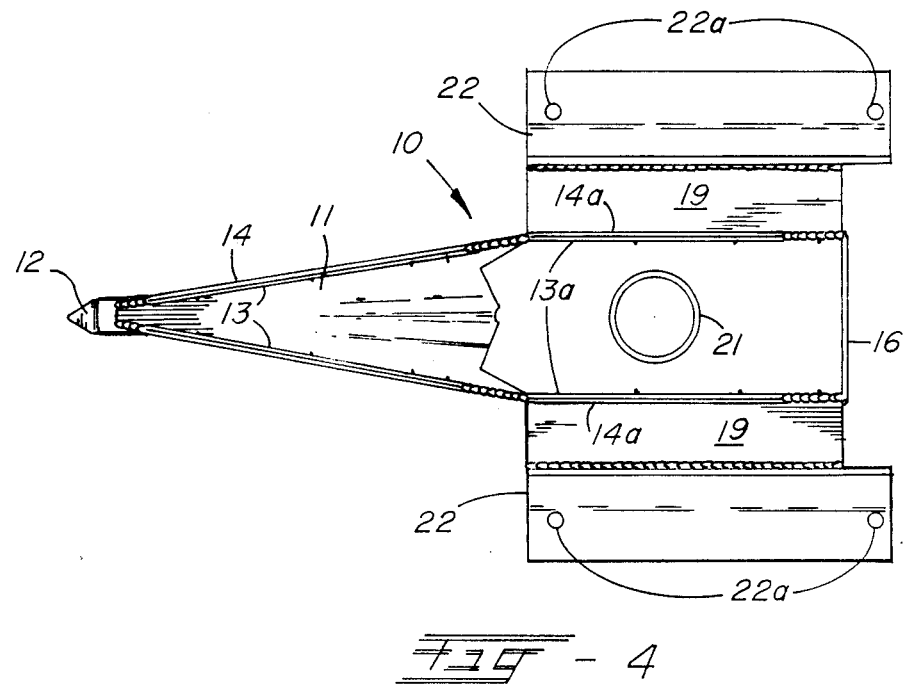

In the form illustrated, the seed planter shoe 10 of the invention, see particularly FIGS. 2–4, comprises an upwardly and rearwardly sloping prow piece 11 preferably made of quarter inch steel plate cut and bent to apex-rounded, widely spread V-shaped that diverges from bottom to top of the shoe and having a toe piece 12 secured, as by welding, to its lower end portion. Prow piece 11 is preferably hard-faced externally with a chrome alloy, and toe piece 12 is preferably a chrome steel alloy.

Welded to prow piece 10 rearwardly, inwardly, and at side edge margins thereof are divergently upwardly and rearwardly sloping side walls 13, respectively. These side walls are also preferably of quarter inch steel plate and are faced externally of the shoe by smooth-faced, hard, and long wearing plates 14, preferably of plastic such as Nylon. Plates 14 are also preferably of quarter inch thickness and are shown as being attached to steel plates 13, face-to-face, by blind rivets 15.

Side walls, faced as they are by the wear plates 14, diverge as they extend backwardly and upwardly for from about one-half to three-quarters of their lengths and then, for the remaining portion of the lengths, 13a and 14a, of their lower portion extend in parallel longitudinally, being interconnected together at their rear ends by a reinforcing cross piece 16. Plates 14 extend short of the lower margins of the steel plate side walls 13 and are supplemented by strips 17 of equivalent thickness steel plate welded to the underlying steel plate of side walls 13 and preferably provided exteriorly with forwardly sloping, diagonal members 17a, such as lines of welding applied to the exterior surfaces of strips 17, to facilitate maintaining of proper depth of the shoe as it is drawn along through the soil.

Figure 1:
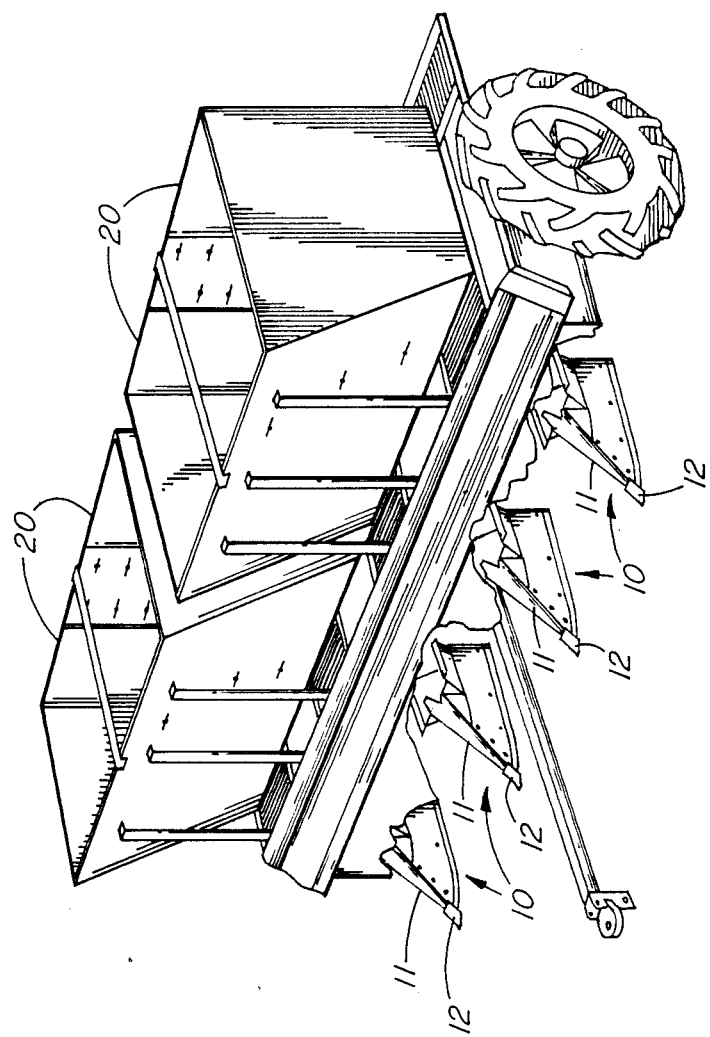
Figure 5:
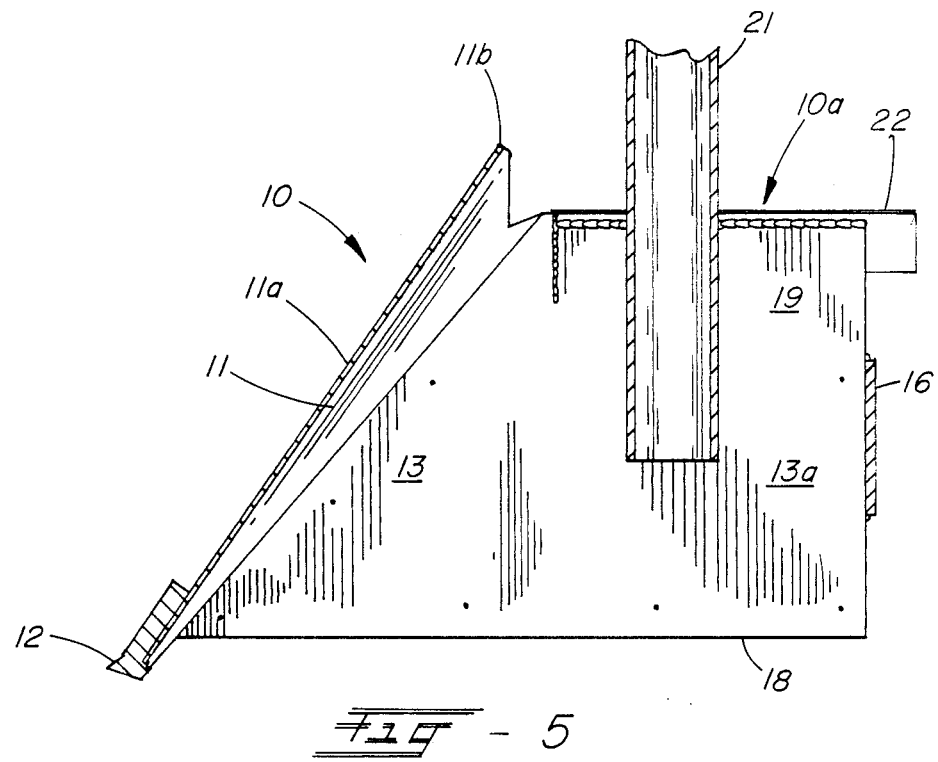

As so constructed, prow piece 11 and the rearwardly extending shoe proper 10a are permanently joined in fixed relationship so as to be in effect integral and so that the apex 11a of such prow piece makes an angle "x", FIG. 2, with the substantially planar bottom 18 of the shoe, which angle is within the range of from about forty-five to fifty degrees, but preferably forty-seven degrees, so trash and soil will rise up and out of the furrow made by the shoe substantially without hang-up. Toe piece 12 depends below planar bottom 18 of the shoe as a soil furrowing point whose bottom surface 12a is also preferably planar substantially in parallel with planar bottom surface 18a of the shoe, and, to insure against fall-back into the furrow of the displaced trash and soil, prow piece 11 rises above the shoe proper 10a, as at 11b, FIG. 5. Furrowing portions of side walls 13 that are located backwardly of the upper end of prow piece 11 extend only partly to the level of the upper end of the prow piece and join upward, outwardly divergent extensions 19 thereof that provide for funneling of seed dropped into the shoe from a bin 20, FIG. 1, either directly or through a pipe 21, FIGS. 3 and 4. Rearward edges of forward portions of side walls 13 are joined to forward edges of the outwardly divergent, side wall extensions 19 by forwardly facing, trash-diverting wall portions 13b, FIG. 2, which, along with the upper end portions of prow piece 11, guard against fall-back of trash and soil into the furrow.

The shoe is provided with means for mounting it on a planter implement, the particular means in any given instance depending upon the particular planter implement on which it will be mounted. In the illustrated instance, the mounting means takes the form of structural angles 22, respectively, welded against the outside faces of the respective walls 19 and provided with bolt holes 22a for attachment to a type of potato planter manufactured and sold by Logan Farm Equipment Co., Inc., of Idaho Falls, Id.

A typical potato planter shoe in accordance with the invention will have a prow piece two inches and a half at the bottom where it joins the toe piece and gradually diverging upwardly over its length of twelve inches to a width at its upper end of five inches and whose apex slopes backwardly at a forty seven degree angle to its planar bottom. The shoe proper 10a has side walls that diverge through approximately one-half of their lengths from being spaced apart about two inches at their welded jounder with the prow piece to being spaced apart about four inches at their ends, the total length of the shoe from front to back at the bottom being about eighteen inches and at the top being about eight and one-half inches. The toe piece will be about four and one-half inches long and will depend from the bottom of the shoe proper a depth of about one inch. These dimensions are approximate and will vary depending upon the type of planter instrument and the seed being planted, the dimensions given here being for planting of seed potatoes.

As installed on a planter implement, the planar bottom of the shoe proper should slope over its length from front to back by an angle of approximately three degrees.

Figure 6:
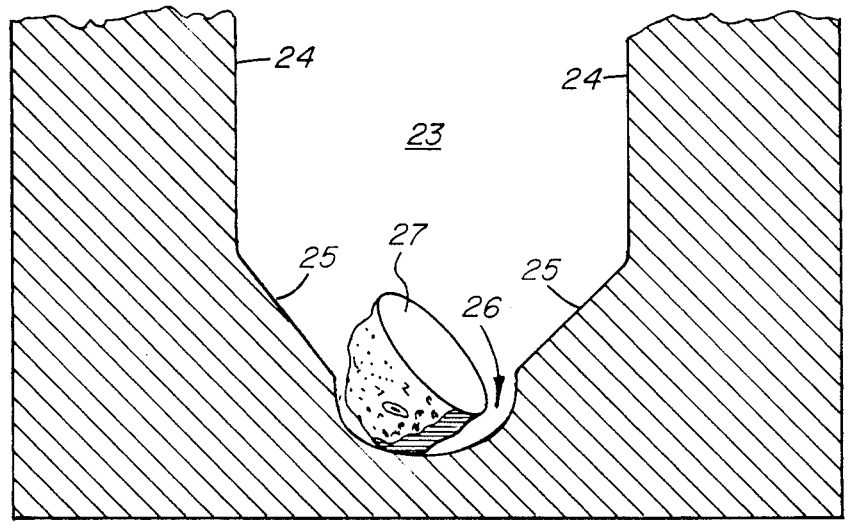

In use, as shown in FIG. 6, shoe 10 digs a substantially vertically-sided main furrow 23 whose side walls 24 have lower extensions 25 sloping inwardly to a planting furrow 26 made by toe 12. A seed potato 27 is shown deposited in planting furrow 26.

As previously indicated, the peculiar shape of the shoe proper 10a with the prow piece 11 insures that the surrounding soil, rather than being tightly compacted as with the usual planter shoes as well as those of the prior art specifically noted, will be raised up and out of the furrows 26 and 23 with substantially no compaction of the surrounding soil.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A seed planter shoe comprising a prow piece of substantially V-shape in cross section sloping and diverging backwardly and upwardly of the shoe for parting the soil along a lower, furrowing portion and with minimum lateral compression thereof to provide a furrow below an upper trash and soil lifting portion thereof; a shoe proper extending rearwardly from said prow piece and having a pair of side walls diverging upwardly and backwardly with said prow piece for from about one-half to about three-quarters of the length of the shoe; furrowing portions of said side walls continuing on longitudinally of the shoe substantially in parallel for the remainder of the length of the shoe, said side walls being rigidly connected at their forward ends to said prow piece inwardly of and at the side edge margins thereof and extending upwardly from adjacent to the bottom thereof to substantially the upper end thereof so as to be essentially integral therewith, furrowing portions of said side walls that are located backwardly of the upper end of said prow piece extending only partly to such upper end of said prow piece; a pair of relatively widely divergent side wall extensions rising from the upper ends of said furrowing portions of the side walls to substantially the top of the shoe but below the upper end of the prow piece, the bottom of said shoe proper being substantially planar and the apex of said prow piece sloping backwardly at an angle to said bottom of from about forty-five to about fifty degrees, so soil and trash will be lifted by and along said prow piece up and out of the furrow provided by said furrowing portions of said side walls; a pair of trash-diverting forwardly facing wall portions joining rearward edges of said forward portions of the side walls with forward edges of said outwardly divergent side wall extensions; and a toe piece fastened to said prow piece and depending therefrom below the bottom of said shoe proper.

2. A seed planter shoe, comprising a prow piece of substantially V-shape in cross section sloping and diverging backwardly and upwardly of the shoe for parting the soil along a lower, furrowing portion and with minimum lateral compression thereof to provide a furrow below an upper trash and soil lifting portion thereof; a shoe proper extending rearwardly from said prow piece and having a pair of side walls diverging upwardly and backwardly with said prow piece for from about one-half to about three-quarters of the length of the shoe; lower; furrowing portions of said side walls continuing on longitudinally of the shoe substantially in parallel for the remainder of the length of the shoe, said side walls being rigidly connected at their forward ends to said prow piece inwardly of and at the side edge margins thereof and extending upwardly from adjacent to the bottom thereof to substantially the upper end thereof so as to be essentially integral therewith, furrowing portions of said side walls that are located backwardly of the upper end of said prow piece extending only partly to such upper end of said prow piece; a pair of relatively widely divergent side wall extensions rising from the upper ends of said portions of the side walls to substantially the top of the shoe but below the upper end of the prow piece, the bottom of said shoe proper being substantially planar and the apex of said prow piece sloping backwardly at an angle to said bottom of from about forty-five to about fifty degrees, so soil and trash will be lifted by and along said prow piece up and out of the furrow provided by said lower, furrowing portions of said side walls; and a toe piece fastened to said prow piece and depending therefrom below the bottom of said shoe proper, said side walls of the shoe proper being of steel plate faced outwardly over a substantial portion of their height by wear-resistant plastic plates, lower portions of said side walls marginal to the bottom of said shoe being faced by strips of steel plate that are themselves faced exteriorly with forwardly sloping, diagonal members to facilitate maintaining of proper depth of the shoe as it is being drawn along through the soil, the diagonal members being lines of welding applied to the exterior surface of said strips.

3. A seed planter shoe according to claim 1, wherein the side walls of the shoe proper are of steel plate outwardly over a substantial portion of their height by wear-resistant plastic plates.

4. A seed planter shoe according to claim 2, wherein lower portions of the side wall marginal to the bottom of the shoe are faced by strips of steel plate.

5. A seed planter shoe according to claim 3, wherein the strips of steel plate are faced exteriorly with forwardly sloping, diagonal members to facilitate maintaining of proper depth of the shoe as it is being drawn along through the soil.

6. A seed planter shoe according to claim 1, wherein the angle of slope of the prow piece is forty-seven degrees.

* * * * *